(12) United States Patent
Bögl et al.

(10) Patent No.: US 9,091,095 B2
(45) Date of Patent: Jul. 28, 2015

(54) TOWER OF A WIND POWER PLANT AND METHOD FOR PRODUCING A TOWER OF A WIND POWER PLANT

(75) Inventors: Stefan Bögl, Sengenthal (DE); Josef Knitl, Freystadt (DE); Martin Hierl, Neumarkt (DE)

(73) Assignee: MAX BOGL BAUUNTERNEHMUNG GMBH & CO. KG, Sengenthal (DE)

( * ) Notice: Subject to any disclaimer, the term of this patent is extended or adjusted under 35 U.S.C. 154(b) by 0 days.

(21) Appl. No.: 13/704,265

(22) PCT Filed: Jun. 10, 2011

(86) PCT No.: PCT/EP2011/059713
§ 371 (c)(1),
(2), (4) Date: Jun. 27, 2013

(87) PCT Pub. No.: WO2011/157659
PCT Pub. Date: Dec. 22, 2011

(65) Prior Publication Data
US 2013/0269286 A1    Oct. 17, 2013

(30) Foreign Application Priority Data

Jun. 14, 2010   (DE) .......................... 10 2010 030 047
Aug. 26, 2010   (DE) .......................... 10 2010 039 796
May 4, 2011     (EP) .................. PCT/EP2011/057088

(51) Int. Cl.
*B28B 1/14*     (2006.01)
*B28B 11/08*    (2006.01)
(Continued)

(52) U.S. Cl.
CPC ................ *E04H 12/00* (2013.01); *E04H 12/08* (2013.01); *E04H 12/12* (2013.01); *E04H 12/16* (2013.01);
(Continued)

(58) Field of Classification Search
CPC ......... E04H 12/00; E04H 12/08; E04H 12/12; E04H 12/16; F03D 1/001; F03D 11/04; F05B 2230/60; F05B 2240/912; F05B 2250/141; Y02E 10/728
USPC ............... 52/745.17, 745.18, 745.19, 651.01; 264/333
See application file for complete search history.

(56) References Cited

U.S. PATENT DOCUMENTS 4,042,659 A * 8/1977 Botting et al. .................. 264/71
4,206,163 A * 6/1980 DeCoster ........................ 264/35
(Continued)

FOREIGN PATENT DOCUMENTS

DE        2326192 A  * 12/1974
DE     199 28 785 A1    1/2001
(Continued)

OTHER PUBLICATIONS

Machine translation for DE 102008016828 A1 retrieved from Espacenet.com on Jul. 24, 2013 (4 pages).*
(Continued)

*Primary Examiner* — Rodney Mintz
(74) *Attorney, Agent, or Firm* — J. Bennett Mullinax, LLC

(57) ABSTRACT

A method for the production of a tower of a wind power plant is disclosed wherein at least one tubular tower section is produced from annular precast concrete parts having two horizontal contact surfaces, which are arranged on top of one another. After casting, the annular precast concrete parts are set up in a processing station in the precast plant and the two horizontal contact surfaces of the precast concrete parts are processed in an orientation setting in a plane-parallel, material-removing manner. A tower of a wind power plant comprises at least one tubular tower section of annular precast concrete parts having two horizontal contact surfaces, which are arranged on top of one another. Both horizontal contact surfaces of the precast concrete parts are reworked in a plane-parallel, material-removing manner with a small parallelism deviation and a small flatness deviation.

13 Claims, 4 Drawing Sheets

(51) Int. Cl.
  *E04H 12/00* (2006.01)
  *E04H 12/08* (2006.01)
  *E04H 12/16* (2006.01)
  *F03D 1/00* (2006.01)
  *F03D 11/04* (2006.01)
  *E04H 12/12* (2006.01)

(52) U.S. Cl.
  CPC ............... *F03D 1/001* (2013.01); *F03D 11/04* (2013.01); *F05B 2230/60* (2013.01); *F05B 2240/912* (2013.01); *F05B 2250/141* (2013.01); *Y02E 10/728* (2013.01)

(56) References Cited

U.S. PATENT DOCUMENTS

| | | | |
|---|---|---|---|
| 4,374,790 A * | 2/1983 | McGowan | 264/32 |
| 4,878,160 A * | 10/1989 | Reneau et al. | 362/269 |
| 4,890,420 A * | 1/1990 | Azimi | 451/273 |
| 5,186,881 A * | 2/1993 | Beaman | 264/256 |
| 5,533,790 A * | 7/1996 | Weiland | 299/1.5 |
| 5,643,488 A * | 7/1997 | Lee | 249/34 |
| 5,645,773 A * | 7/1997 | Ichikawa | 264/31 |
| 5,728,334 A * | 3/1998 | Lee | 264/82 |
| 5,830,394 A * | 11/1998 | Dolgopolov | 264/122 |
| 5,878,540 A * | 3/1999 | Morstein | 52/296 |
| 6,277,316 B2 * | 8/2001 | Kistner et al. | 264/275 |
| 6,340,790 B1 * | 1/2002 | Gordin et al. | 174/45 R |
| 6,808,384 B1 * | 10/2004 | Jordan et al. | 425/432 |
| RE40,228 E * | 4/2008 | Savoca | 362/431 |
| 7,739,843 B2 * | 6/2010 | Cortina-Cordero | 52/223.5 |
| 7,877,944 B2 | 2/2011 | Seidel | |
| 8,030,377 B2 * | 10/2011 | Dubey et al. | 524/5 |
| 8,402,718 B2 * | 3/2013 | Stiesdal | 52/845 |
| 8,413,405 B2 * | 4/2013 | Meesenburg | 52/745.17 |
| 8,418,413 B2 * | 4/2013 | Marmo et al. | 52/167.4 |
| 8,465,687 B2 * | 6/2013 | Hager | 264/312 |
| 8,555,600 B2 * | 10/2013 | Cortina-Cordero et al. | 52/745.18 |
| 8,597,564 B2 * | 12/2013 | Holscher | 264/333 |
| 8,681,923 B2 * | 3/2014 | Ashida et al. | 376/287 |
| 8,808,604 B2 * | 8/2014 | Cho | 264/333 |
| 2003/0000165 A1 | 1/2003 | Tadros et al. | |
| 2004/0074171 A1 | 4/2004 | Wobben | |
| 2004/0134275 A1 * | 7/2004 | Reichel et al. | 73/432.1 |
| 2005/0110197 A1 * | 5/2005 | Deffense | 264/333 |
| 2005/0120670 A1 * | 6/2005 | Ness et al. | 52/745.19 |
| 2005/0121830 A1 * | 6/2005 | Ness et al. | 264/293 |
| 2005/0129504 A1 | 6/2005 | DeRoest | |
| 2006/0179779 A1 * | 8/2006 | Ness | 52/596 |
| 2006/0254168 A1 | 11/2006 | Wobben | |
| 2006/0254196 A1 | 11/2006 | Wobben | |
| 2009/0000227 A1 | 1/2009 | Jakubowski et al. | |
| 2009/0031639 A1 * | 2/2009 | Cortina/Cordero | 52/40 |
| 2010/0154351 A1 * | 6/2010 | Messenburg | 52/745.17 |
| 2010/0281818 A1 * | 11/2010 | Southworth | 52/745.17 |
| 2010/0325986 A1 * | 12/2010 | Garciá Maestre et al. | 52/223.3 |
| 2011/0107708 A1 | 5/2011 | Holscher | |
| 2011/0131899 A1 * | 6/2011 | Voss et al. | 52/173.1 |
| 2011/0158750 A1 | 6/2011 | Reichel et al. | |
| 2012/0243943 A1 | 9/2012 | Bögl et al. | |
| 2012/0260591 A1 * | 10/2012 | Holscher et al. | 52/294 |
| 2013/0081350 A1 * | 4/2013 | Bogl et al. | 52/651.01 |
| 2014/0208665 A1 * | 7/2014 | Kapitza et al. | 52/123.1 |
| 2014/0283478 A1 * | 9/2014 | Horn et al. | 52/651.07 |

FOREIGN PATENT DOCUMENTS

| | | | |
|---|---|---|---|
| DE | 10133607 A1 * | 8/2002 | |
| DE | 102 30 273 | 2/2004 | |
| DE | 102008015838 A1 * | 10/2009 | |
| DE | 102008016828 A1 * | 10/2009 | |
| DE | 202010000169 U1 * | 5/2010 | |
| DE | 102012104508 A1 * | 11/2013 | |
| EP | 0 960 986 A2 | 12/1999 | |
| JP | 09248745 A * | 9/1997 | |
| WO | WO 03/069099 | 8/2003 | |
| WO | WO 2004007955 A1 * | 1/2004 | |
| WO | WO 2009121581 A3 * | 12/2009 | |
| WO | WO 2010/044380 A1 | 4/2010 | |

OTHER PUBLICATIONS

German Search Report and Written Opinion for DE 10 2010 039 796.2 dated Feb. 9, 2011 (4 pages).*
U.S. Appl. No. 13/704,263.
International Search Report and Written Opinion for PCT/EP2011/057088 dated Dec. 22, 2011.
International Search Report and Written Opinion for PCT/EP2011/059713 dated Dec. 7, 2011.
Non-final Office Action for U.S. Appl. No. 13/704,263 mailed Nov. 8, 2013, 30 pages.

* cited by examiner

TOWER OF A WIND POWER PLANT AND METHOD FOR PRODUCING A TOWER OF A WIND POWER PLANT

TECHNICAL FIELD

This invention is a method for building a tower, especially a tower of a wind power plant, in which at least one tubular tower section made of annular prefabricated concrete parts arranged on top of one another is built with two horizontal contact surfaces. Furthermore, the invention refers to a tower, especially a tower of a wind power plant, with at least one tubular tower section made of concrete, developed from annular prefabricated concrete parts arranged on top of one another with two horizontal contact surfaces.

BACKGROUND

Towers for wind energy power plants are constructed from prefabricated concrete parts manufactured in a prefabricated part facility. According to a typical state of the art method, the prefabricated concrete parts are transported to the assembly site after they are manufactured and placed on top of one another to assemble a tower. However, to accomplish this, they must first be straightened with respect to one another. In this case, a casting compound is placed between the prefabricated parts so the large production tolerances of the prefabricated concrete parts, which generally amount to several millimeters for large parts as is the case here, are compensated. Furthermore, a casting compound is necessary in the joint between the prefabricated parts to seal the tower. The disadvantage of this method is that building by straightening the parts requires a lot of effort and is time consuming. Moreover, the building of the tower at the assembly site is possible only under good weather conditions.

For this reason, DE 10 2008 016 A 1 suggests an improved method for manufacturing prefabricated concrete parts for wind energy power plants. Here, the prefabricated concrete part is manufactured in a casting mold with a level floor so that the underside of the prefabricated concrete part can be very accurately manufactured.

A layer of epoxy resin milled over parallel to the underside after hardening is applied on the upper side of the prefabricated concrete part. In this method, the casting mold must already be very accurate for the manufacturing of the level underside. Thus, the manufacturing of the mold is relatively difficult. Furthermore, the grinding station must make available a precisely positioned seat for the prefabricated concrete part.

The task of the present invention is to suggest a method for building a tower from prefabricated concrete parts that allow the tower to be built easily and quickly.

SUMMARY

In a method for building a tower, especially a tower for a wind energy power plant, at least one tubular tower section is built with annular prefabricated concrete parts each comprising two horizontal contact surfaces arranged on top of one another. According to the invention, after pouring, the annular prefabricated concrete parts are clamped in a processing station in the prefabricated parts manufacturing facility and the two horizontal contact surfaces of each of the prefabricated concrete parts are processed in a single orientation setting to remove material in a plane-parallel manner. In this method, the horizontal contact surfaces made of concrete are refinished directly, so that the additional application of a leveling layer on the contact surfaces is no longer necessary. The difficult manufacturing of a very precise casting mold is not necessary either, as the horizontal contact surfaces are exactly refinished only after the pouring process has been completed.

A tower, especially a tower of a wind energy power plant, has at least one tubular tower section made of concrete that comprises annular prefabricated concrete parts arranged on top of one another with two horizontal contact surfaces. According to the invention, the two horizontal contact surfaces of each of the prefabricated concrete parts are refinished by removing material in a plane-parallel manner with a parallel and flatness deviation of only a few tenths of millimeters, preferably of less than 0.2 mm (about 0.008 inches). The development of prefabricated concrete parts with such small tolerances allows the tower to be erected quickly by simply placing the structural parts on top of each other. Owing to the small tolerances during the erection, no alignment and leveling work is necessary any longer; only the centering of the generally annular prefabricated concrete parts placed on top of one another must be ensured. Compliance with such small tolerances in prefabricated concrete parts weighing several tons and measuring several meters is possible by favorably refinishing both contact surfaces in the same fixture, i.e. the same orientation setting.

It is advantageous when the prefabricated concrete parts with a parallel and flatness deviation of a few tenths of a millimeter, preferably of less than 0.2 mm (about 0.008 inches), are re-ground. When a grinding process is employed, the desired precision can be achieved especially well, reaching tolerances in the range between 0.1 mm (about 0.004 inches) and 0.2 mm (about 0.008 inches).

If a tower made of re-ground prefabricated concrete parts is built, then dry joints between two prefabricated concrete parts arranged on top of one another can be made without taking further measures and without using casting compounds owing to the very small parallelism and evenness deviations. These joints have a width of less than 0.5 mm (about 0.02 inches) already in the tower's unstressed condition. If the prefabricated concrete parts are reground very accurately with deviations of just 0.1 mm (about 0.004 inches), the width of the joints in the unstressed condition can be less than 0.2 mm (about 0.008 inches). If afterwards the tower's prefabricated concrete parts are stressed against one another with clamping devices and an initial stress is exerted on the tower, then the width of the joints can be reduced even more and the prefabricated concrete parts can be connected continuously without joints.

In this case, it is advantageous if the prefabricated concrete parts are braced by means of external pre-stressing tendons running along the tower's interior. As a result of this, the manufacture of the prefabricated concrete parts is simplified because no jacket tubes for the clamping devices must be provided. Also, the pre-stressing tendons remain accessible for inspection purposes and maintenance work.

If the joints are executed in a dry manner (i.e. without applying a casting or leveling compound between the prefabricated concrete parts) at the assembly site, the building of the tower is greatly simplified and can be completed quickly. The high-quality execution of the contact surfaces makes the sealing of the joints unnecessary, since they can be completely eliminated by bracing the prefabricated concrete parts.

For manufacturing the prefabricated concrete parts with exact plane-parallel horizontal contact surfaces, it is advantageous if the annular prefabricated concrete parts are turned on their vertical axis during processing. The easy processing of the horizontal contact surfaces in the same fixture, or orientation setting, is made possible with this method. It is advantageous that highly precise and parallel contact surfaces can be created in spite of the less than exact positioning of the prefabricated concrete part.

It is furthermore advantageous if the annular prefabricated concrete parts are processed in a horizontal orientation (i.e. in their subsequent assembly position) on a revolving table. This method allows conical or parabolic prefabricated concrete parts, in particular, to be easily positioned on the revolving table.

For clamping the prefabricated concrete parts on a revolving table, they are advantageously provided with a fastening device for securely holding the prefabricated concrete parts. The device can already be cast in them or be created in a recess in the concrete. For example, nuts for use as fastening devices can be cast therein that can be engaged by a steel console.

For manufacturing annular prefabricated concrete parts with a large diameter, it is advantageous if, before re-grinding, they are put together from two or more ring segments and secured. Preferably, the prefabricated concrete parts are screwed or bolted together.

After re-grinding, the prefabricated concrete parts are disassembled in ring segments for transportation to the assembly site. Owing to their smaller size compared to the complete rings, they can still be easily transported on the highway.

In a tower made of prefabricated concrete parts, the individual ring segments are put together again to become an annular prefabricated concrete part with the help of a casting compound. Since the casting compound is used in a very small area, the annular prefabricated concrete parts can nonetheless be very easily put together and assembled regardless of weather conditions. Additionally, the concrete segments can still be braced or screwed together.

If the annular prefabricated concrete parts comprise two or more ring segments, then it is furthermore advantageous if vertical contact joints are also executed in a dry manner between the contact surfaces of the ring segments of the prefabricated concrete parts. In this case, the ring segments are pre-stressed in a horizontal direction, preferably with diagonally arranged clamping elements (e.g., with screws). The joint can nonetheless be created without screwed connections, in which case the vertical joint is held together only by the vertical bracing of the tower section made of concrete. Here, the ring segments of one ring are in each case arranged in twisted position against each other in successive rings.

To enhance the tower's sealing even more, however, it can also be advantageous to provide a sealing profile between the horizontal contact surfaces of the prefabricated concrete parts. To achieve this, the prefabricated concrete parts have an annular groove for a sealing profile on their upper horizontal contact surface. After re-grinding in the same fixture, or orientation setting, the annular groove is incorporated into the upper horizontal contact surface of the prefabricated concrete parts. Preferably, the annular groove is inserted with a saw.

According to another advantageous further development of the invention, the prefabricated concrete parts should have at least one recess on their contact surfaces, preferably at least one bore hole so that an element (e.g. a plastic dowel) for securing the position and/or for anti-twisting can be used in the bore hole. Here, several bore holes are preferably distributed evenly over the circumference.

After re-grinding, the recesses or centering bore holes are preferably incorporated into both horizontal contact surfaces, likewise in the same fixture, or orientation setting.

According to an advantageous further development of the invention, after re-grinding and/or incorporating the annular groove and/or the recesses, the prefabricated concrete parts are measured with a contact-free measuring system, preferably in the same fixture, or orientation setting.

By combining several processing steps in one single processing station, the prefabricated concrete parts can be manufactured with great precision without rearrangement, in which case the positioning on a revolving table favorably allows for processing with several tools and for the measuring.

BRIEF DESCRIPTION OF THE DRAWINGS

Further advantages of the invention are described with the help of the embodiments shown below, in which.

DETAILED DESCRIPTION

Figure 1:
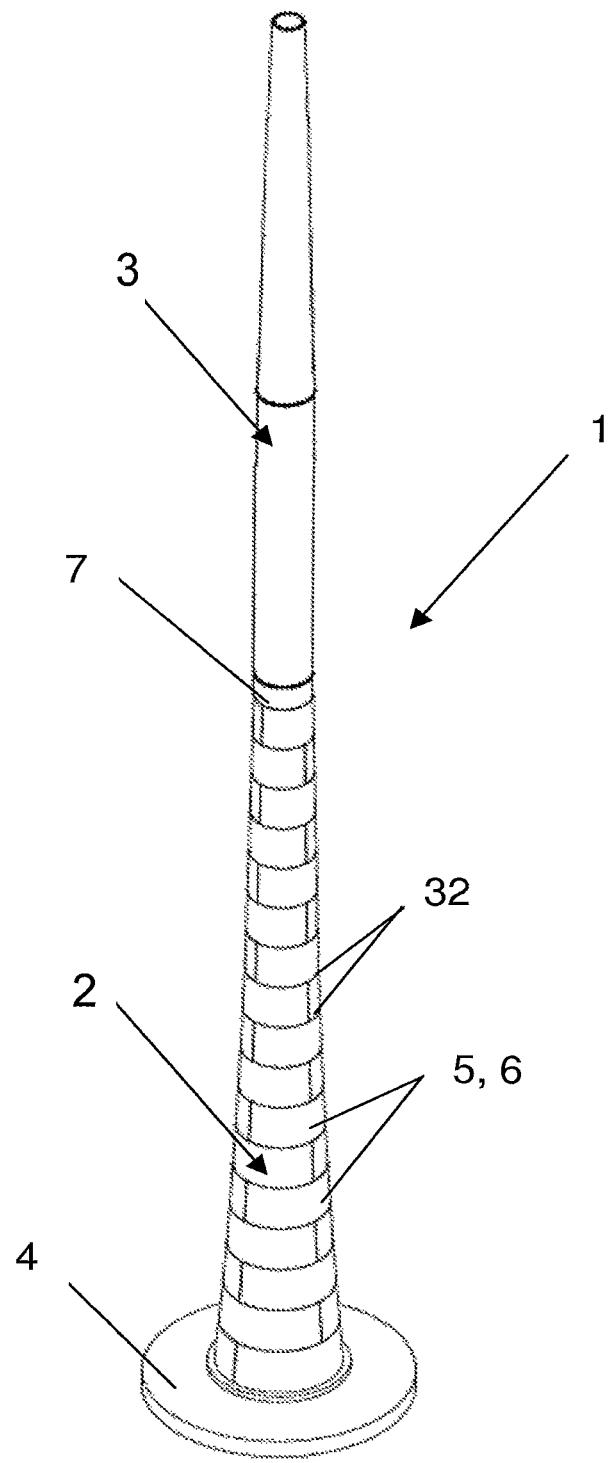
FIG. 1 illustrates an overview or the tower according to the invention with a concrete section, a steel section and an adapter piece.

FIG. 1 shows a perspective overview of a tower 1 for a wind power plant, for example. The tower 1 has been executed as a hybrid tower, for which a lower tubular tower section 2 made of concrete and an upper tubular tower section 3 made of steel have been provided. Furthermore, the tower 1 has a foot section 4 or a foundation. On the tower section made of steel 3, a nacelle and rotor are arranged in a known way, but are not shown here.

Figure 4:
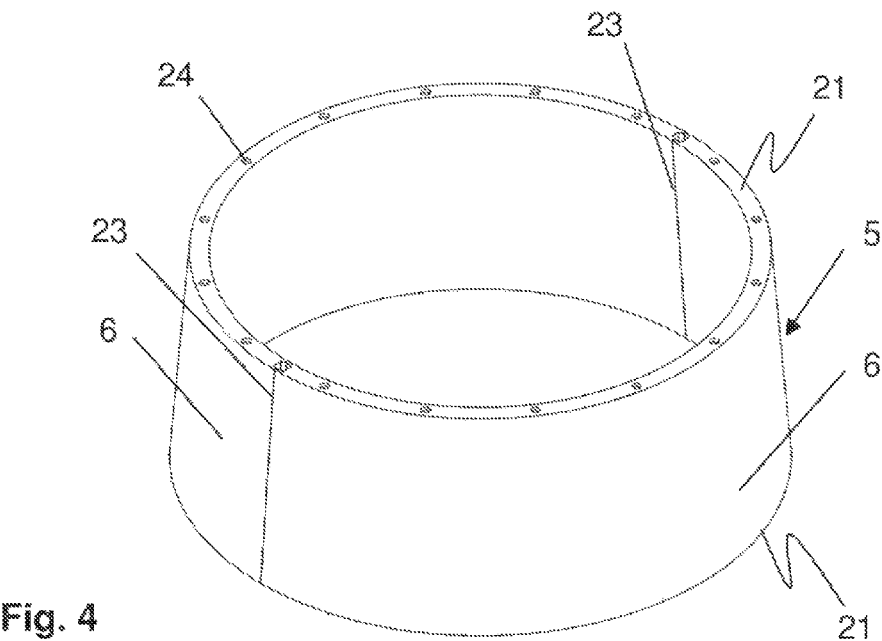
FIG. 4 illustrates a view of an annular prefabricated concrete part for a tower according to the invention.

In this case, the tower section 2 made of concrete is made of individual, annular prefabricated concrete parts 5, which here comprise in each case, two ring segments 6, as can be seen in FIG. 4. As a result of this, huge towers with very large diameters in their foot area can also be favorably built using the prefabricated construction method because the individual prefabricated parts can be easily transported. The tower section 3 made of steel can be prefabricated as one single part and brought to the assembly site or likewise be made of several parts assembled at the assembly site or already beforehand in a production site. An adapter piece 7 is provided for easily and flexibly connecting the tower section 2 made of concrete and the tower section 3 made of steel.

During assembly of the tower section 2 made of concrete, the prefabricated concrete parts 5 are placed dry on top of one another and braced against each other. The prefabricated concrete parts 5 (see FIG. 4), which here comprise in each case two ring segments 6, have in each case one upper and one lower horizontal contact surface 21.

Figure 2:
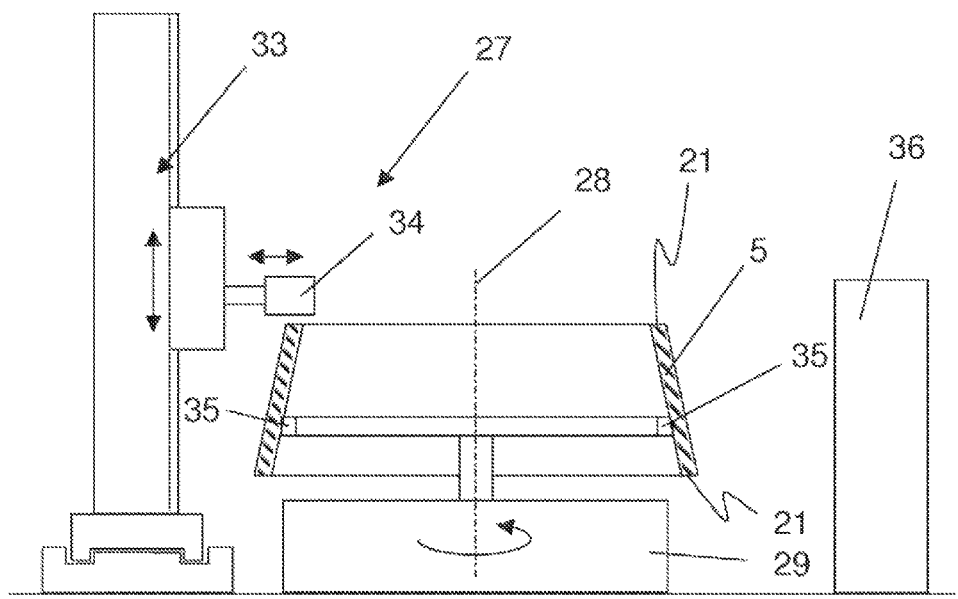
FIG. 2 illustrates a schematic view of a processing station and the processing of the annular prefabricated concrete parts.

FIG. 2 shows a processing station 27, in which the cast and hardened prefabricated concrete parts 5 are refinished in a prefabricated part factory to remove material. The processing station has a revolving table 29 on which the annular prefabricated concrete parts 5 are clamped. Processing is done here with a travel stand grinding machine 33 positioned on a revolving table 29 and adjustable in all three spatial axes. As a result of this, a grinding head 34 can be moved on the upper and lower horizontal contact surface 21 without the need to clamp down the prefabricated concrete part 5 again. The revolving table 29 has a motor so the prefabricated concrete parts 5 can be rotated around their vertical axis 28 during processing. As a result of this, it is possible to process both horizontal contact surfaces 21 exactly plane-parallel to one another in one single fixture, i.e., a single orientation setting.

In this case, the prefabricated concrete part 5 includes fastening devices 35 for clamping it on the revolving table 29. Depending on the execution of the seat of the revolving table 29, the conical prefabricated parts 5, in particular, can also be merely placed on a correspondingly shaped seat.

Thanks to the production steps independent from one another, namely pouring of the prefabricated concrete part 5 and manufacturing of the exactly horizontal contact surfaces 21, errors or tolerances of the pouring process cannot exert an effect on the development of the contact surfaces 21. Owing to the fact that both horizontal contact surfaces 21 are created in one production step and in the same fixture by refinishing tile prefabricated concrete part 5, a difficult set-up of the prefabricated concrete part 5 in the processing station is furthermore not necessary, as the parallelism between the upper and lower contact surface 21 is always ensured. Even angular deviations in the fixture have no effect on the building of the tower 1 and the groove creation, as even if the prefabricated concrete part 5 is obliquely clamped, the parallelism of both contact surfaces 21 can be ensured.

Refinishing with a travel stand grinding machine 33 can re-grind the prefabricated concrete parts 5 with an accuracy of down to 0.1 mm (about 0.004 inches) to 0.2 mm (about 0.008 inches), resulting in the smallest deviations from evenness and parallelism. By very precisely refinishing the prefabricated concrete parts 5 by re-grinding, the width of the joints 32 between the prefabricated concrete parts 5 placed on top of one another is less than 0.5 mm (about 0.020 inches), preferably merely 0.2 mm (about 0.008 inches). For this reason, the tower 1 can be erected at the assembly site without performing complex adjustment work and without using a leveling compound between the individual prefabricated concrete parts 5 by simply placing the prefabricated concrete parts 5 on top of one another. Once the desired tower height has been reached, the prefabricated concrete parts 5 arranged on top of one another are pre-stressed with pre-stressing tendons, thus reducing joint width even more. Owing to the minimal and precise development of the joints, special measures for sealing the tower 1 are therefore not necessary either. However, to ensure the tower's leak-proof sealing in any case, a sealing profile 31 (see FIG. 5) can be provided between the individual prefabricated concrete parts 5.

As also shown in FIG. 4, the prefabricated concrete parts 5, 6 can have one or several recesses 24, in this case bore holes, on their contact surfaces 21. In these recesses, a plastic dowel, for example (not shown), can be placed for engaging in the prefabricated concrete part 5, 6 lying on top, thus preventing a horizontal displacement or twisting of the prefabricated concrete parts 5, 6. Instead of the plastic dowel, another element for securing their position or preventing their twisting made from the most varied materials can also be used. An especially good fixation of the individual prefabricated concrete parts 5, 6 to each other can be achieved if, as shown here, several dowels and/or recesses 24 are distributed over the circumference of the prefabricated concrete part 5, 6.

Figure 5:
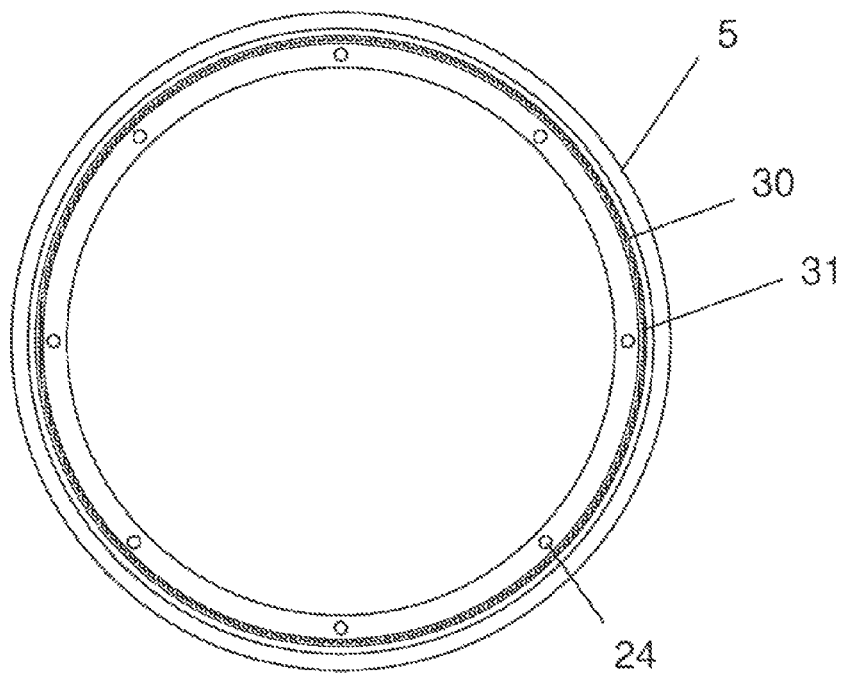
FIG. 5 illustrates a schematic top view of an annular prefabricated concrete part for a tower according to the invention.

FIG. 5 shows a prefabricated concrete part 5, which has an annular groove 30 for a sealing profile 31 in addition to the recesses 24. This construction facilitates the placement of the individual prefabricated concrete parts 5 on top of one another at the assembly site. In the prefabricated parts factory, the sealing profile 31 can already be used in the annular groove 30 and fixed in place there. The fast assembly of the tower 1 at the construction site is further facilitated as a result of this.

It is advantageous that the recesses 24, the annular groove 30 and, if need be, additional processing steps, can also be formed in the same fixture, or orientation setting, so that very precise prefabricated concrete parts 5 can be produced. Because all processing steps can take place in one single processing station 27 after the pouring of the concrete, the prefabricated parts 5 can be produced very economically in spite of the very precise execution. As can also be seen in FIG. 2, the processing station 27 is also equipped with a contact-free measuring system 36 so that defective prefabricated concrete parts 5 can already be separated in the prefabricated parts factory.

If the annular prefabricated concrete parts 5 comprise two or several ring segments 6 (as shown in FIG. 1 or FIG. 4), the ring segments 6 are assembled to create annular finished parts 5 before the grinding process and are likewise refinished in this assembled state. After re-grinding the contact surfaces 21 and, if need be, completing additional processing steps, the ring segments 6 are once more detached from one another so they can have an acceptable size for highway transportation.

Finally, the vertical contact joints 23 between the individual ring segments 6 are cast on the ground to create stable annular prefabricated concrete parts 5. Since merely a very small area needs to be cast, the tower assembly is not delayed. If need be, the vertical contact joints 23 can be likewise formed in a dry manner, however.

So the individual ring segments 6 can be fixed in place against one another, diagonally arranged screw joints (not shown) can be provided in the area of the vertical contact joints 23. However, a fixation of the ring segments 6 to each other can also be accomplished solely by the pre-load force of the pre-stressing tendons 13 and an offset of the individual ring segments 6 in each ring 5. In this case, the vertical contact joints 23 of the following ring 5 are offset in each case by 90° (see FIG. 1).

Figure 3:
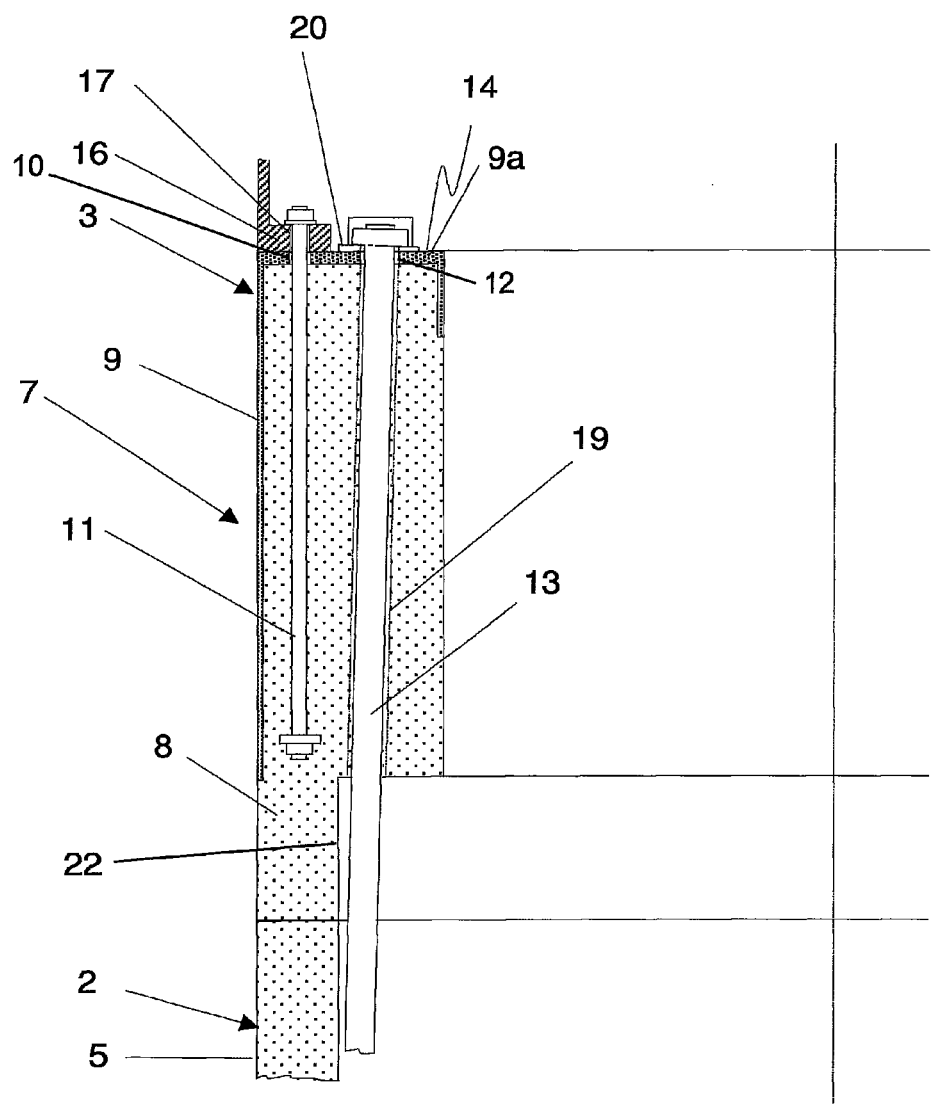
FIG. 3 illustrates a cross section of an adapter piece.

FIG. 3 shows the sectional view of an execution of an adapter piece 7, which includes an internal annular concrete element 8 and an external annular steel element 9, which on its upper end in installation position has an annular flange 9a pointing inwards. It is advantageous if (as shown here) the cross section of the steel element 9 is largely U-shaped, so that it encompasses the upper area of the concrete element 8. As a result of this, an especially good connection between the concrete element 8 and the steel element 9 plus an especially high load-bearing capacity of the concrete element 8 can be achieved.

As can additionally be seen in FIG. 3, numerous perpendicularly oriented anchoring bolts 11 have been set in the concrete element 8 of the adapter piece 7. Here, the anchoring bolts 11 have been guided by the respective bore holes 10 of the flange 9a and protrude above the upper side 14 of the adapter piece. Thus, when subsequently assembling the tower 1, only the tower section 3 made of steel, which, in its foot area, has a fastening flange 16 with numerous fastening bore holes 17 distributed over the circumference, must be guided above the anchoring bolts for fastening. The anchoring bolts 11 can be provided with a separating compound so they are not directly connected to the concrete element 8 and can be disassembled again. As a result of this, a subsequent disassembly of the tower 1 or an exchange of the anchoring bolts 11 during maintenance is made possible. Likewise, the anchoring bolts 11 can also be cast in a jacket tube to allow disassembly and exchange.

As can also be seen in FIG. 3, the flange 9a of the adapter piece 7 has numerous openings 12 for fixing the pre-stressing tendons 13. Furthermore, jacket tubes 19 have been cast in the concrete element 8 of the adapter piece 7 to allow for an easy, subsequent pre-tensioning of the prefabricated concrete parts 5. To accomplish this, the pre-stressing tendons 13 are inserted through the jacket tube 19 in the concrete element 8 and the openings 12 in the flange 9a and fixed in place on the upper side 14 of the flange 9a. In this case, the pre-stressing tendons 13 are fixed without an anchoring plate directly on the flange 9a. Only when the pre-stressing tendons 13 run obliquely a wedge plate 20 is placed underneath, as shown here. The execution of the flange 9a according to the invention, which is especially well connected with the concrete element 8, allows it to also take over the function of a load distribution plate.

In the installed position, the adapter element 7 has a recess 22 on the lower end so that the pre-stressing tendons are merely guided within the wall of tower 1 in the area of the adapter piece 7 and otherwise extend along the interior of the tower outside the wall down to the foot section 4 of the tower 1, where they are also anchored. However, to guide the pre-stressing tendons 13, they could also be fastened or at least guided at certain distances along the height of the tower by means of suitable fastening or guidance elements. Instead of the tension accomplished with external pre-stressing tendons 13 shown here, the initial stress can naturally also be exerted on the tower section made of concrete 2 with pre-stressing tendons 13 placed in the concrete cross-section.

The invention is not limited to the embodiments shown. Modifications and combinations also fall within the scope of the invention.

The invention claimed is:

1. A method for building a tower for a wind power plant, the method comprising:
   providing annular prefabricated concrete parts comprising poured concrete for making at least one tubular tower section formed by placing the annular prefabricated concrete parts on too of one another, each annular prefabricated concrete part comprising two horizontal contact surfaces, each of the two horizontal contact surfaces of the respective annular prefabricated concrete parts forming a joint with another horizontal contact surface of another prefabricated concrete part;
   clamping each of said annular prefabricated concrete parts in a single orientation setting in an installation position on a revolving table in a processing station of a prefabricated parts factory;
   processing each of said annular prefabricated concrete parts to remove material from both of the two horizontal contact surfaces of each of said prefabricated concrete parts by rotating the annular prefabricated concrete parts on the revolving table around a vertical axis while the annular prefabricated concrete parts are in the same single orientation setting so that the two horizontal contact surfaces of each of said annular prefabricated concrete parts are plane-parallel without application of a leveling layer; and
   placing the annular prefabricated concrete parts on top of one another to form said at least one tubular tower section.

2. The method according to claim 1, wherein the processing of each of the annular prefabricated concrete parts further comprises regrinding the horizontal contact surfaces of the annular prefabricated concrete parts to obtain a specified deviation from parallelism and a specified deviation from evenness and wherein each of the annular prefabricated concrete parts comprise two or more ring segments and further comprising securing the two or more ring segments together in to the respective annular prefabricated concrete part before regrinding and disassembling each annular prefabricated concrete part into the two or more ring segments for transportation to an assembly site after regrinding.

3. The method according to claim 1, wherein the clamping of each of the annular prefabricated concrete parts further comprises clamping each of the annular prefabricated concrete parts in a horizontal orientation in the installation position on revolving table.

4. The method according to claim 1, wherein said joint between two of the prefabricated concrete parts arranged on top of one another has a width of less than about 0.5 mm (about 0.02 inches) in a non-tensioned state of the tower.

5. The method according to claim 1, wherein the processing of each of the annular prefabricated concrete parts further comprises regrinding the horizontal contact surfaces of the annular prefabricated concrete parts with a deviation from parallelism and a deviation from evenness of less than about 0.2 mm (about 0.008 inches).

6. The method according to claim 5, further comprising, after regrinding in the same orientation setting, incorporating recesses into the two horizontal contact surfaces.

7. The method according to claim 6, further comprising, after incorporating the recesses, measuring the prefabricated concrete parts with a contact-free measuring system in the same orientation setting.

8. The method according to claim 5, further comprising, after regrinding in the same orientation setting, incorporating an annular groove for a sealing profile into an upper horizontal contact surface of each of the prefabricated concrete parts.

9. The method according to claim 8, further comprising, after regrinding, measuring the prefabricated concrete parts with a contact-free measuring system in the same orientation setting.

10. The method according to claim 8, further comprising, after incorporating the annular groove, measuring the prefabricated concrete parts with a contact-free measuring system in the same orientation setting.

11. The method according to claim 1, wherein each of the annular prefabricated concrete parts comprise two or more ring segments and further comprising securing the two or more ring segments together in to the respective annular prefabricated concrete part before processing and disassembling each annular prefabricated concrete part into the two or more ring segments for transportation to an assembly site after processing.

12. The method according to claim 11, further comprising reassembling the two or more ring segments once again to become the respective annular prefabricated concrete part at the assembly site.

13. The method according to claim 12, further comprising placing the prefabricated concrete parts on top of one another at the assembly site and bracing dry said prefabricated concrete parts against one another with external pre-stressing tendons without applying a casting or leveling compound between the prefabricated concrete parts.

* * * * *